United States Patent
McHugh et al.

(10) Patent No.: US 12,296,724 B2
(45) Date of Patent: May 13, 2025

(54) SEAT BASE FOR A CHILD RESTRAINT

(71) Applicant: Dorel Juvenile Group, Inc., Foxboro, MA (US)

(72) Inventors: William P. McHugh, Norfolk, MA (US); Jason H. Johnson, Brownstown, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 293 days.

(21) Appl. No.: 17/882,023

(22) Filed: Aug. 5, 2022

(65) Prior Publication Data

US 2023/0045293 A1    Feb. 9, 2023

Related U.S. Application Data

(60) Provisional application No. 63/230,308, filed on Aug. 6, 2021, provisional application No. 63/230,202, filed on Aug. 6, 2021.

(51) Int. Cl.
    *B60N 2/28*    (2006.01)

(52) U.S. Cl.
    CPC ......... *B60N 2/2806* (2013.01); *B60N 2/2821* (2013.01); *B60N 2/2869* (2013.01)

(58) Field of Classification Search
    CPC ... B60N 2/2806; B60N 2/2869; B60N 2/2821
    See application file for complete search history.

(56) References Cited

U.S. PATENT DOCUMENTS

| | | | |
|---|---|---|---|
| 6,428,099 B1 * | 8/2002 | Kain | B60N 2/2863 |
| | | | 297/256.16 |
| 6,817,665 B2 | 11/2004 | Pacella | |
| 7,478,877 B2 | 1/2009 | Lhomme | |
| 7,950,738 B2 | 5/2011 | Shafer | |
| 8,550,555 B2 | 10/2013 | Fritz | |
| 9,937,823 B2 | 4/2018 | Williams | |
| 10,023,079 B2 | 7/2018 | Zhao | |
| 10,035,436 B2 | 7/2018 | Zhou | |
| 10,266,077 B2 | 4/2019 | Mason | |
| 10,322,651 B2 | 6/2019 | Hutchinson | |
| 10,336,219 B2 | 7/2019 | Mason | |
| 10,710,478 B2 | 7/2020 | Reaves | |
| 2015/0183341 A1 * | 7/2015 | Carpenter | B60N 2/2803 |
| | | | 297/256.16 |
| 2016/0347210 A1 * | 12/2016 | Mason | B60N 2/2821 |
| 2022/0063455 A1 * | 3/2022 | Goare | B60N 2/2821 |
| 2022/0332225 A1 * | 10/2022 | Hutchinson | B60N 2/2863 |

* cited by examiner

*Primary Examiner* — David R Dunn
*Assistant Examiner* — Tania Abraham
(74) *Attorney, Agent, or Firm* — Barnes & Thornburg LLP

(57) ABSTRACT

A seat base for a child restraint includes a seat-base foundation adapted to rest on a vehicle seat to support the child restraint in the vehicle. The seat-base foundation has a belt-path surface configured to receive a seat belt. The seat base further includes a seat-belt retainer coupled to the seat-base foundation for movement from an opened position to a closed position to clamp a vehicle seat belt between the seat-belt retainer and the seat-base foundation.

20 Claims, 13 Drawing Sheets

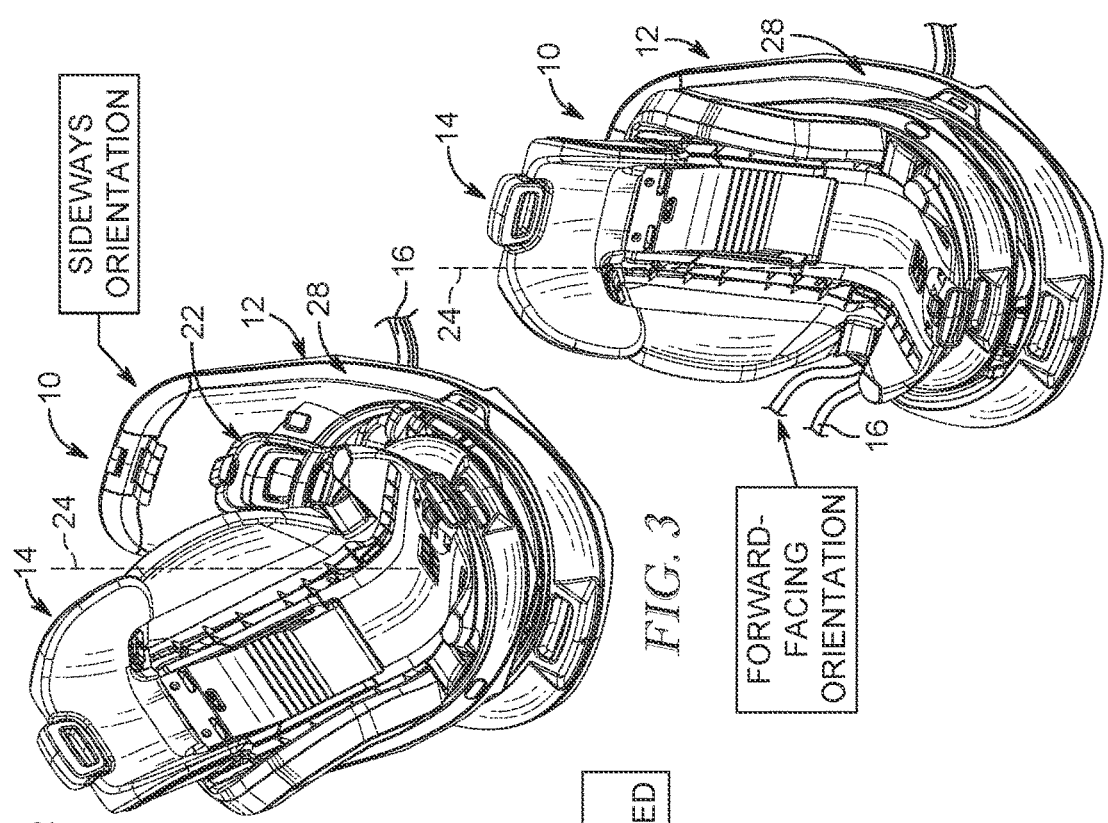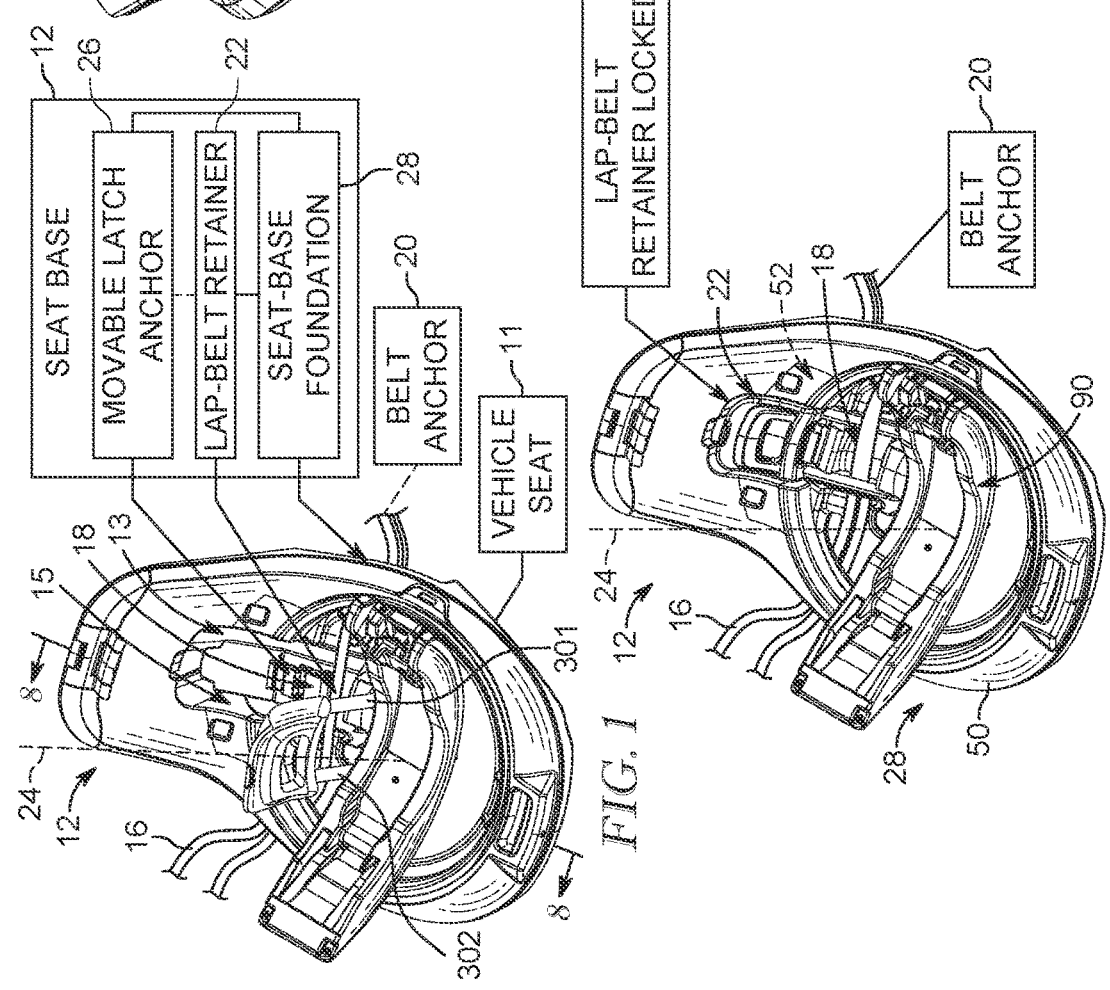

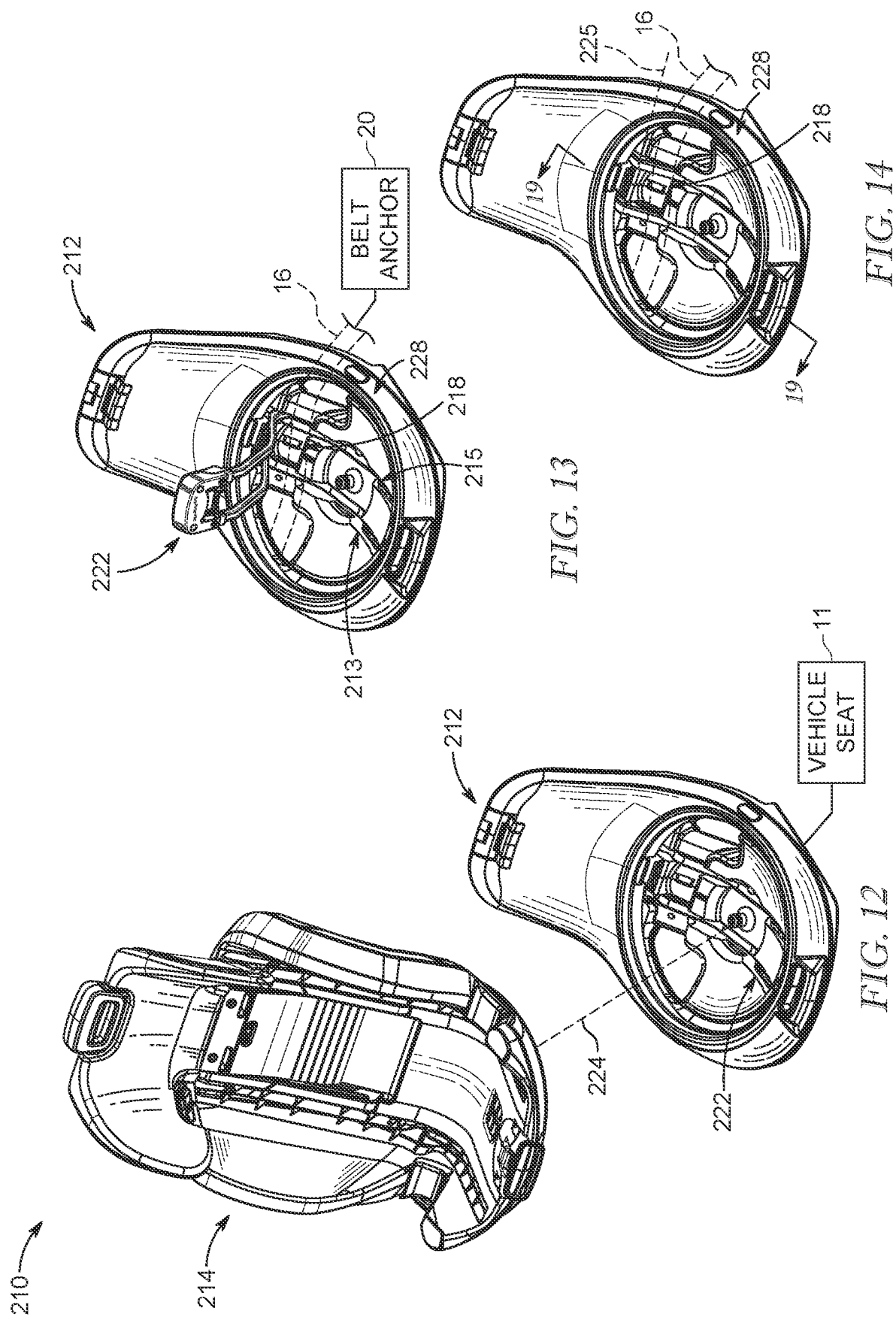

SEAT BASE FOR A CHILD RESTRAINT

PRIORITY CLAIM

This application claims priority under 35 U.S.C. § 119 (e) to U.S. Provisional Application Ser. No. 63/230,202, filed Aug. 6, 2021, and to U.S. Provisional Application Ser. No. 63/230,308, filed Aug. 6, 2021, each of which is expressly incorporated by reference herein.

BACKGROUND

The present disclosure relates to a seat base for a child restraint, and particularly to a seat base that is configured to mount a juvenile seat to a vehicle seat. More particularly, the present disclosure relates to a seat base for a child restraint adapted to receive a vehicle seat belt.

SUMMARY

According to the present disclosure, a seat base for a child restraint includes a seat-base foundation adapted to rest on a vehicle seat and a seat-belt retainer coupled to the seat-base foundation. The seat-base foundation has a belt-path surface configured to receive a vehicle seat belt of the vehicle. The seat-belt retainer is configured to pivot about a horizontally-extending pivot axis between an opened position and a closed position. In the opened position, the seat-belt retainer extends outwardly away from the belt-path surface to expose the belt path surface. In the closed position, the seat-belt retainer overlies the belt path surface to clamp the vehicle seat belt between the seat-belt retainer and the seat-base foundation.

In illustrative embodiments, the seat base further includes a movable latch anchor coupled to the seat-base foundation and configured to engage the seat-belt retainer in the closed position to block movement of the seat-belt retainer from the closed position to the opened position. The movable anchor pin is configured to be moved relative to the seat-base foundation by the seat-belt retainer to disengage from the seat-belt retainer so that the seat-belt retainer is free to pivot about the horizontally-extending pivot axis from the closed position to the opened position.

In illustrative embodiments, the seat-belt retainer includes a seat-belt clamp, a retainer latch, and an anchor-release unit. The seat-belt clamp is configured to engage the vehicle seat belt in the closed position to clamp the vehicle seat belt between the seat-belt retainer and the seat-base foundation. The retainer latch is configured to engage with the movable anchor pin in the closed position to block movement of the seat-belt retainer from the closed position to the opened position. The anchor-release unit is configured to move the movable anchor pin relative to the seat-base foundation to release the retainer latch so that the seat-belt retainer is free to pivot about the horizontally-extending pivot axis away from the movable latch anchor.

In illustrative embodiments, the anchor-release unit includes a handle housing, an actuator handle, and an anchor mover. The handle housing is coupled to a distal end of the seat-belt clamp and is spaced apart from the horizontally-extending pivot axis. The actuator handle is received within an internal handle-receiving space formed in the handle housing. The anchor mover is coupled to the actuator handle for movement therewith. The anchor mover is configured to actuate the movable latch anchor away from the retainer latch upon movement of the actuator handle relative to the handle housing from an expanded position to a compressed position.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective and diagrammatic view of a seat base included in a child restraint as shown in FIGS. 3 and 4, the seat base including a seat-base foundation configured to mount to a vehicle seat, a seat-belt retainer arranged in an opened position to expose a belt path surface of the seat base foundation, and a movable latch anchor coupled to the seat base foundation and configured to engage with the seat-belt retainer to retain the seat-belt retainer in a closed position clamping the vehicle seat belt to the seat-base foundation as shown in FIG. 2;

FIG. 2 is a view similar to FIG. 1 showing the seat-belt retainer in the closed position clamping the vehicle seat belt to the seat-base foundation;

FIG. 3 is a perspective view of the child restraint showing a juvenile seat mounted on the seat base of FIGS. 1 and 2 in a sideways orientation after the seat-belt retainer has been moved to the closed position to clamp the vehicle seat belt to the seat-base foundation;

FIG. 4 is a view similar to FIG. 3 showing the child restraint rotated relative to the seat base to a forward-facing orientation to overlie the seat-belt retainer while the seat belt retainer is in the closed position;

Figure 5:
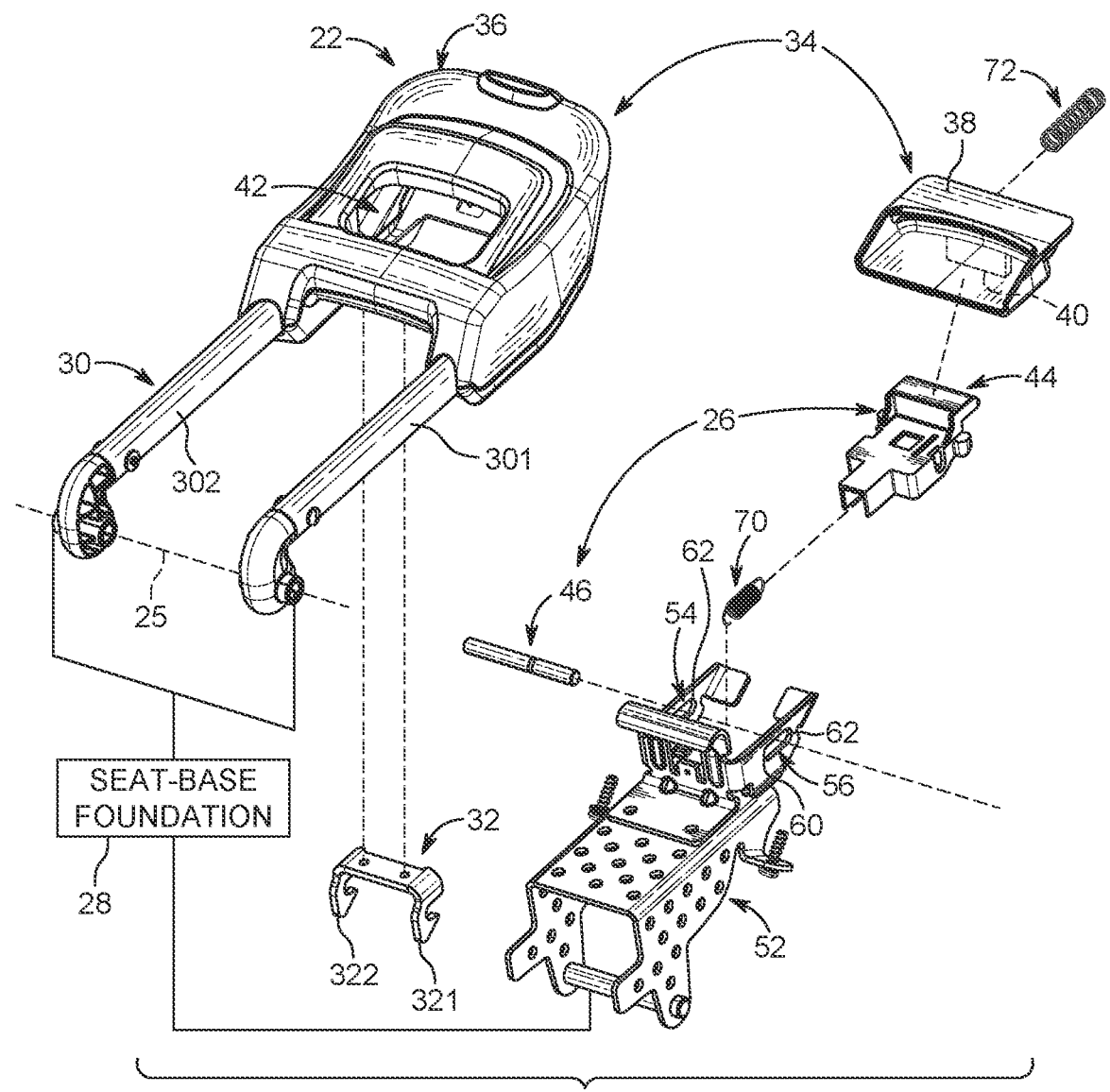
Figure 7:
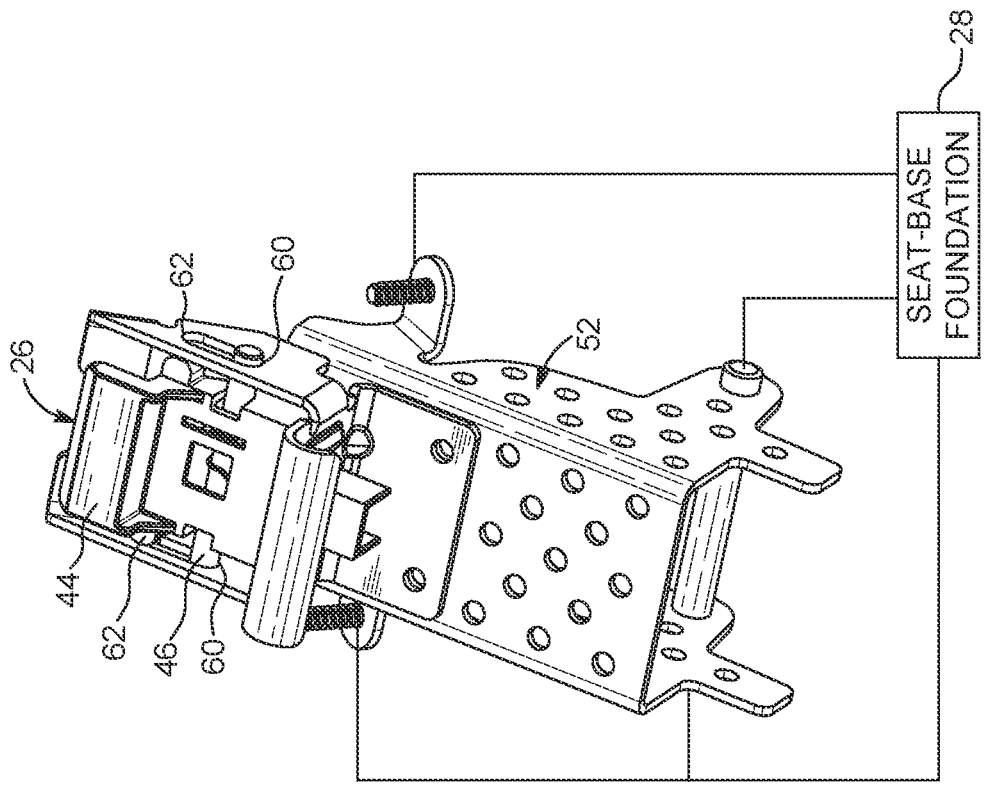
Figure 6:
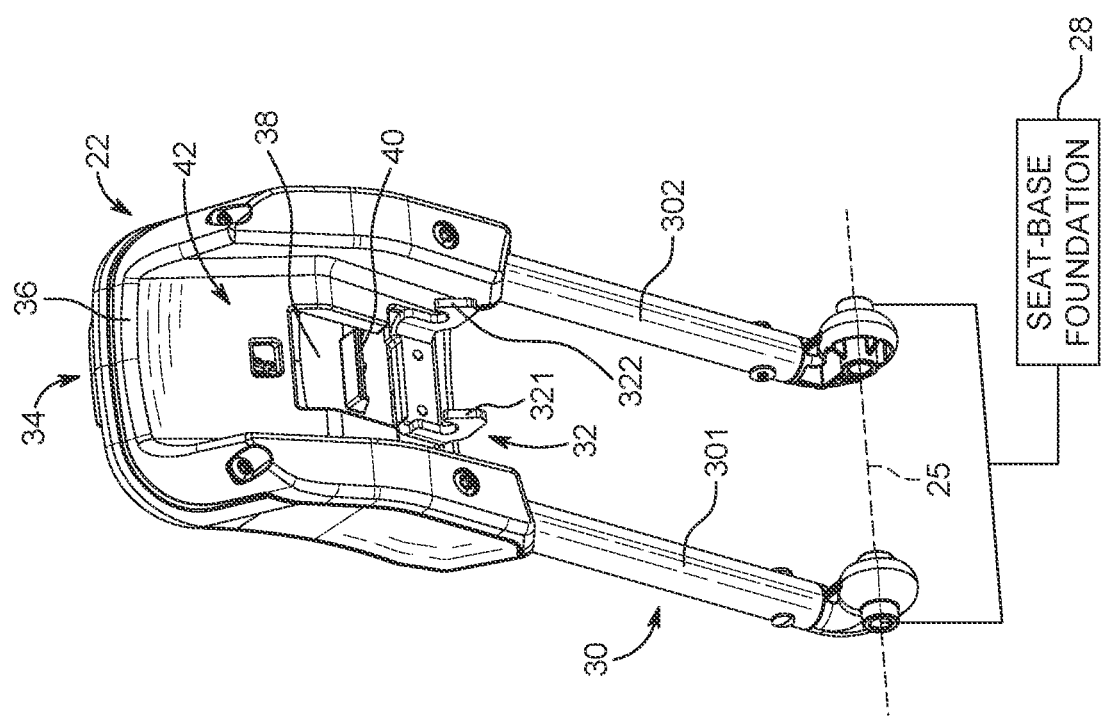
Figure 8:
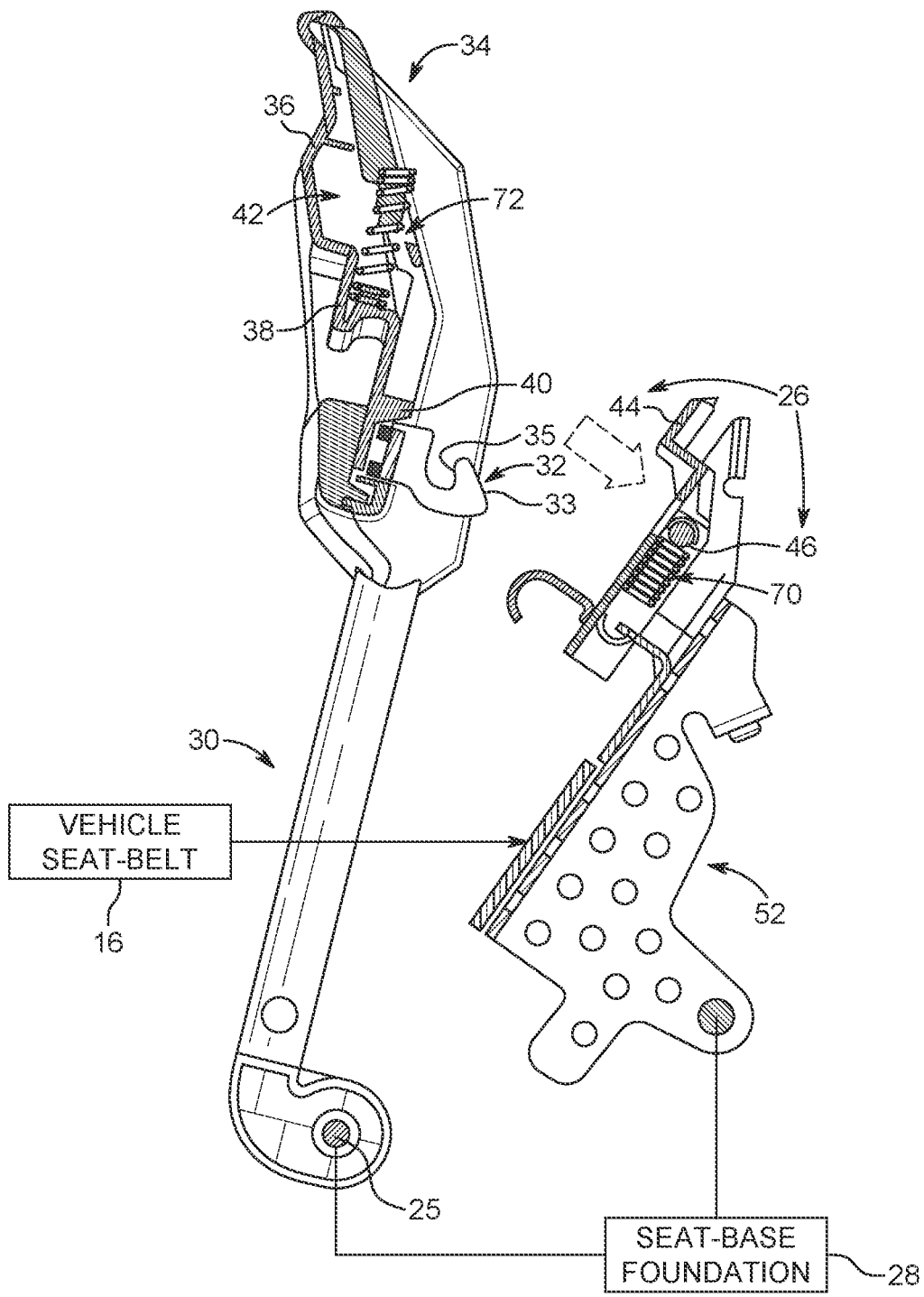
Figure 9:
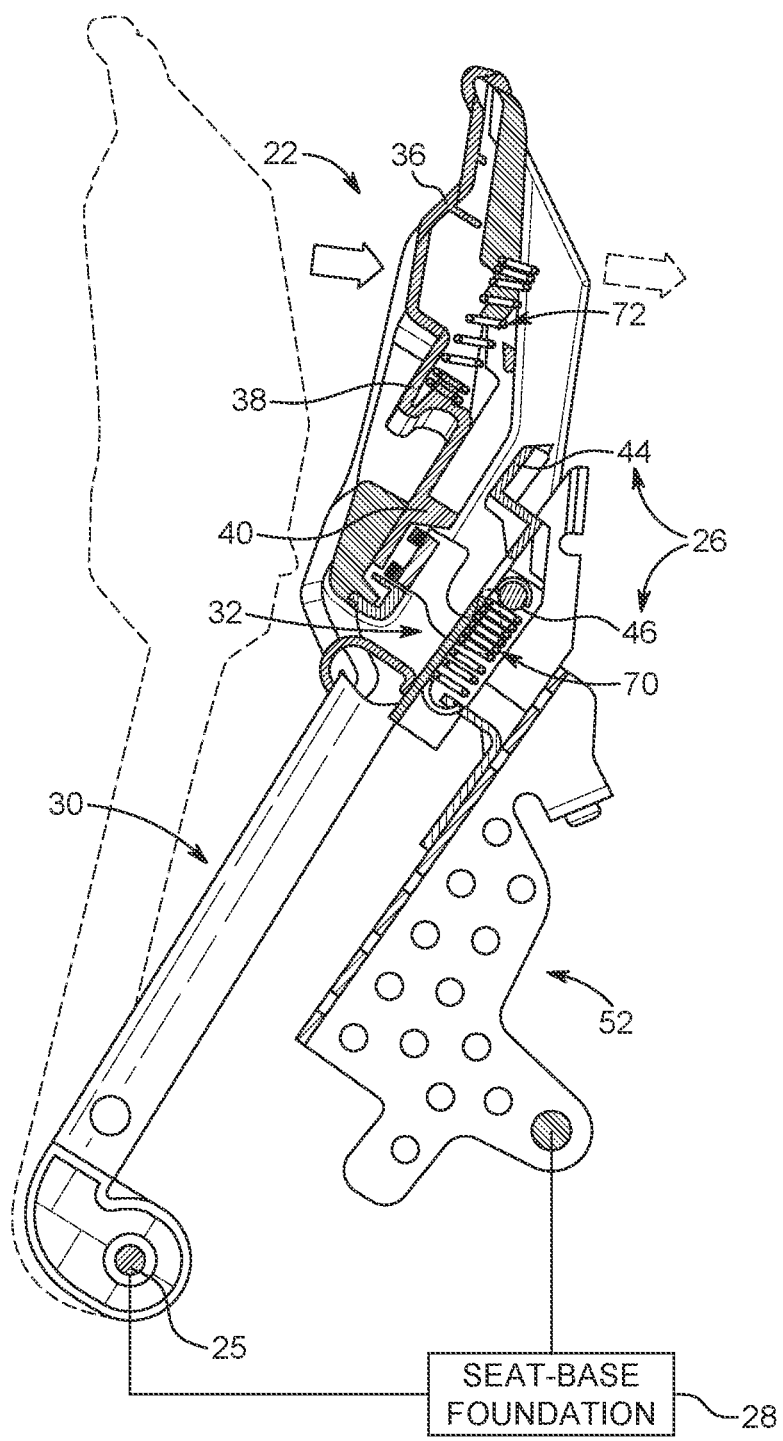
Figure 10:
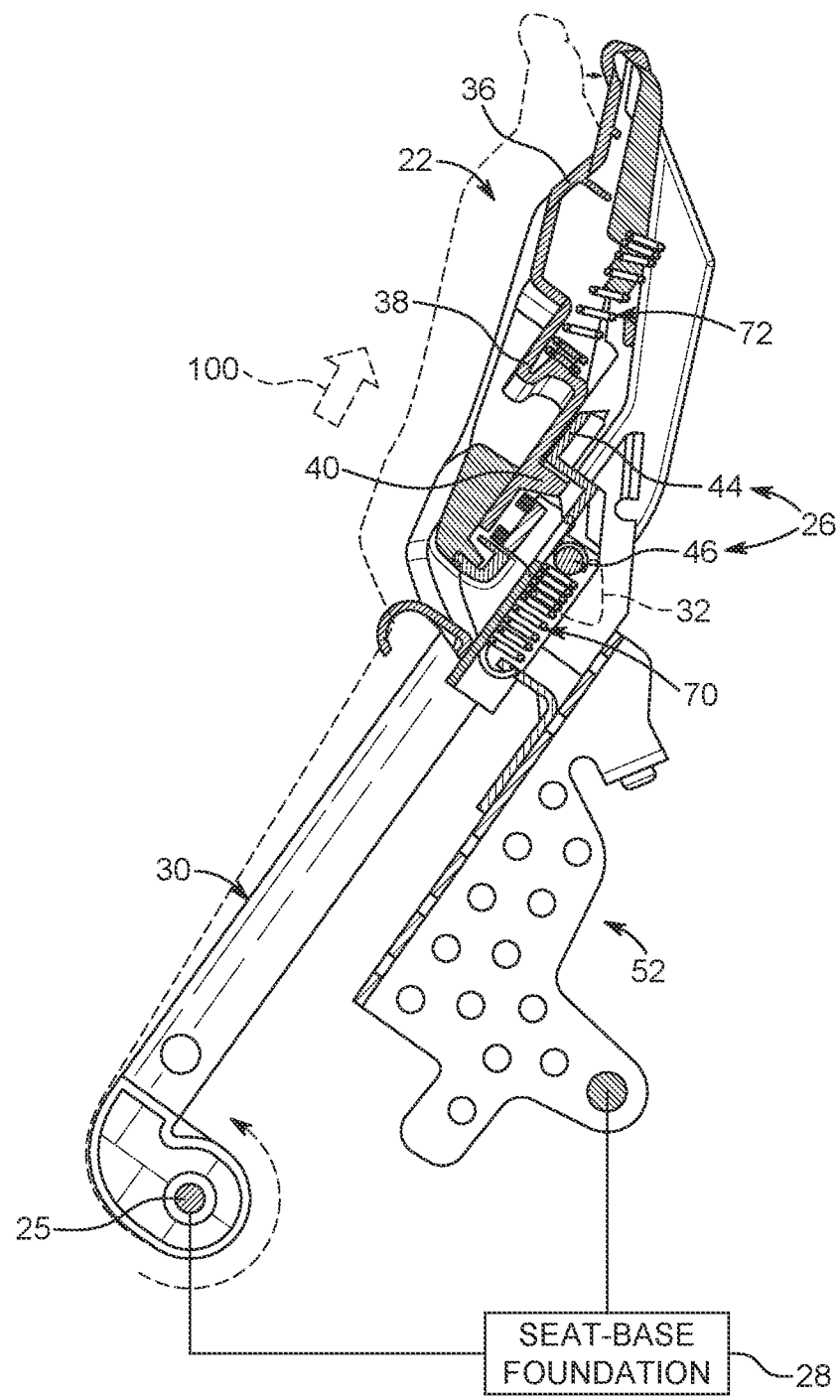
Figure 11:
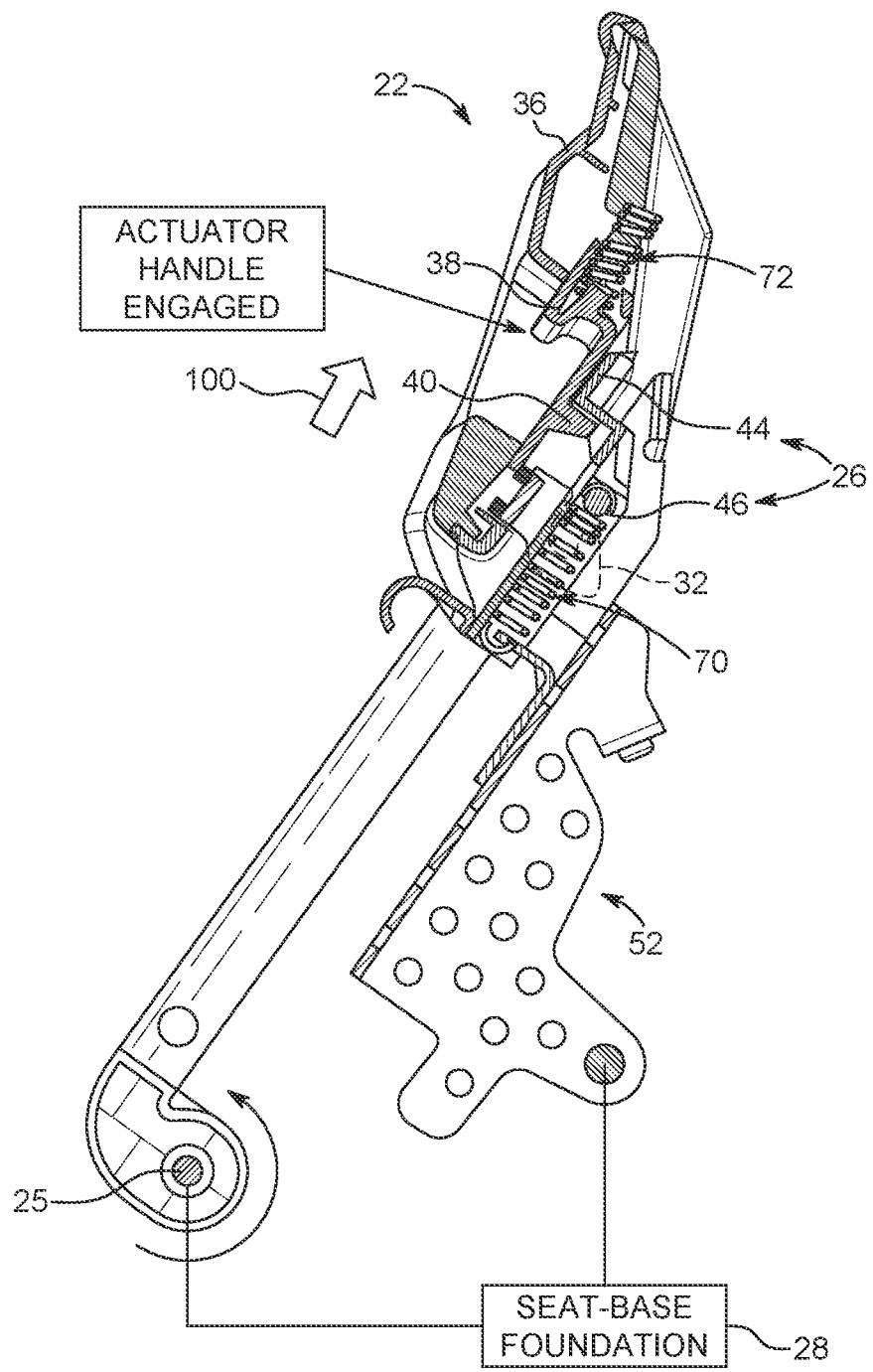
Figure 15:
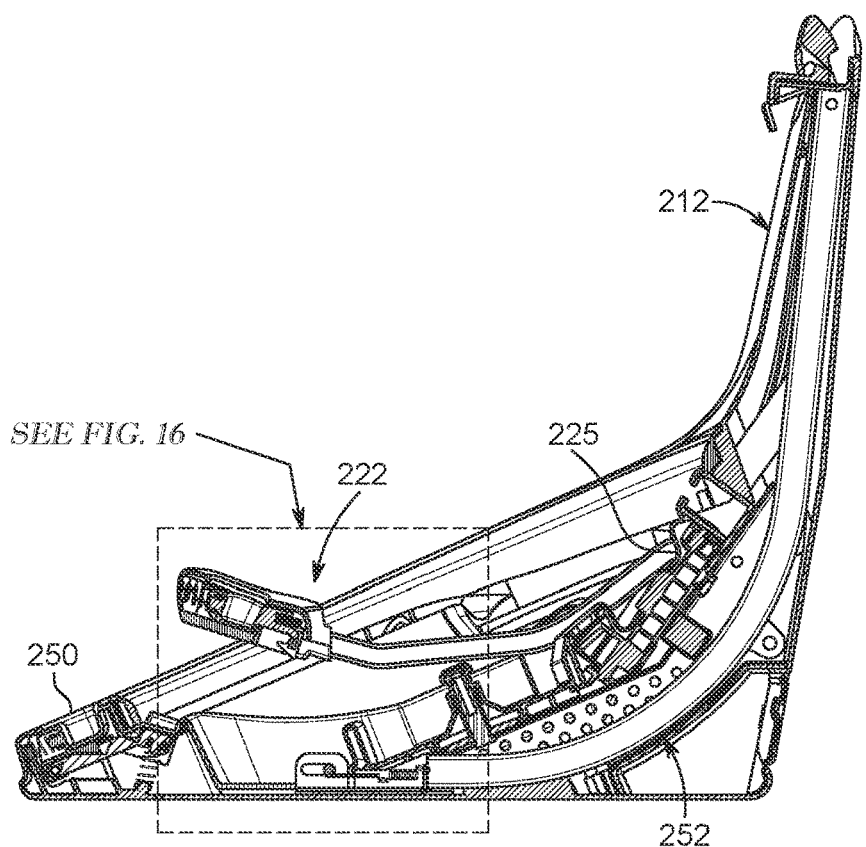
Figure 16:
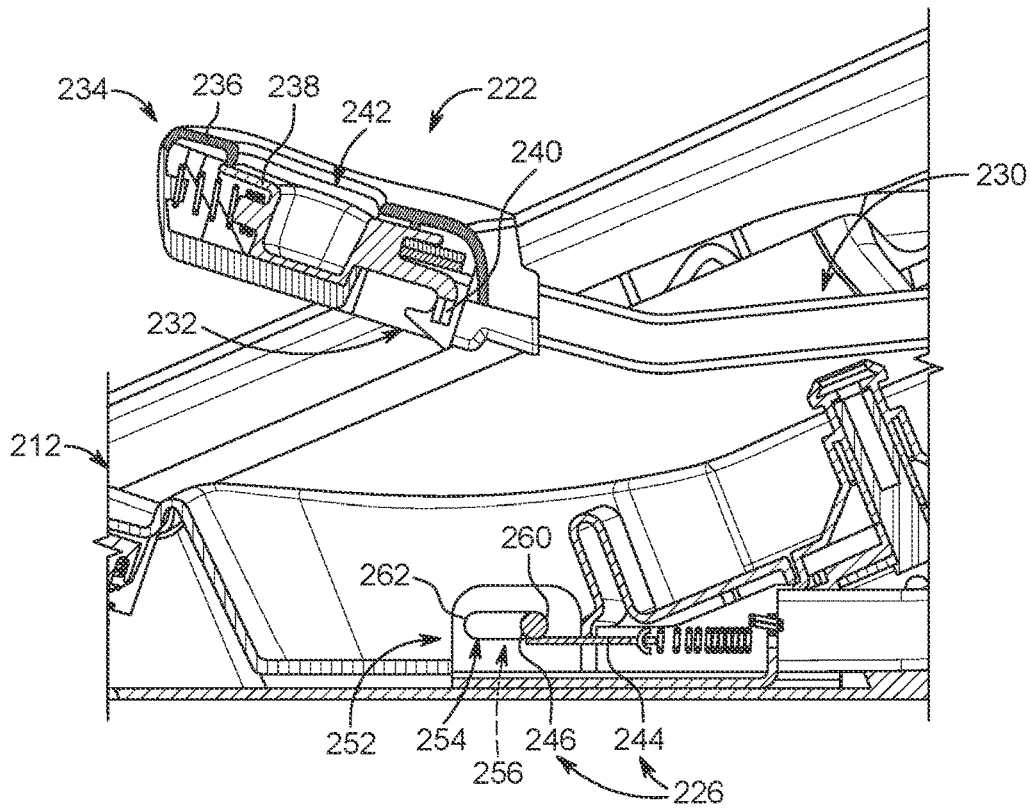
Figure 17:
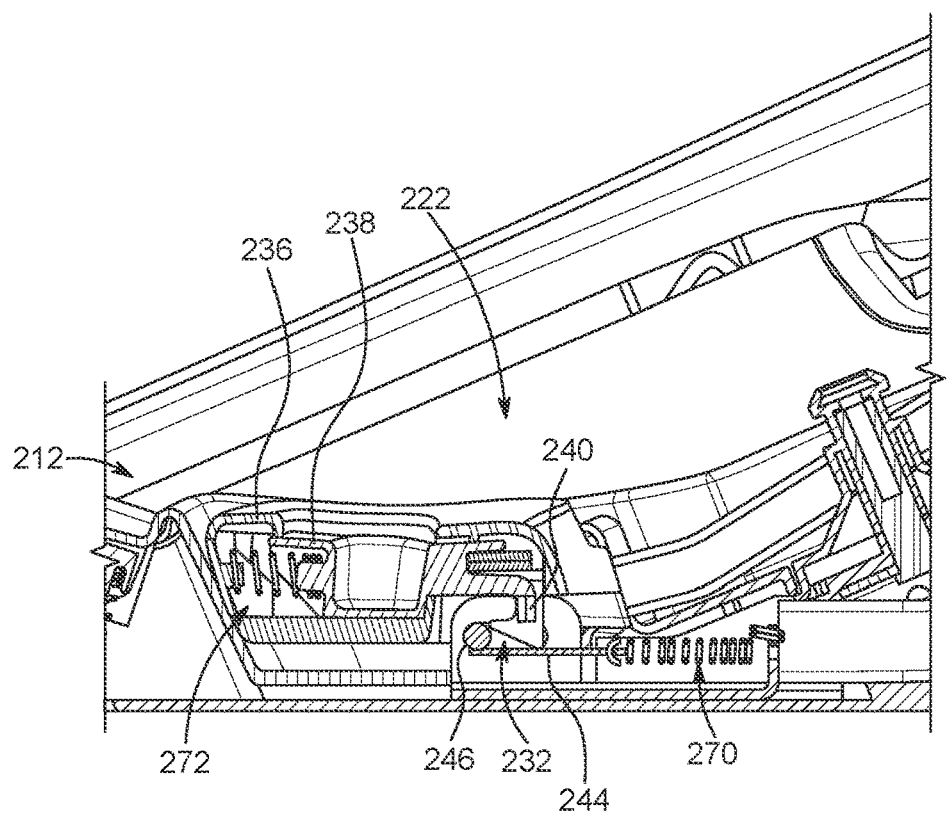
Figure 18:
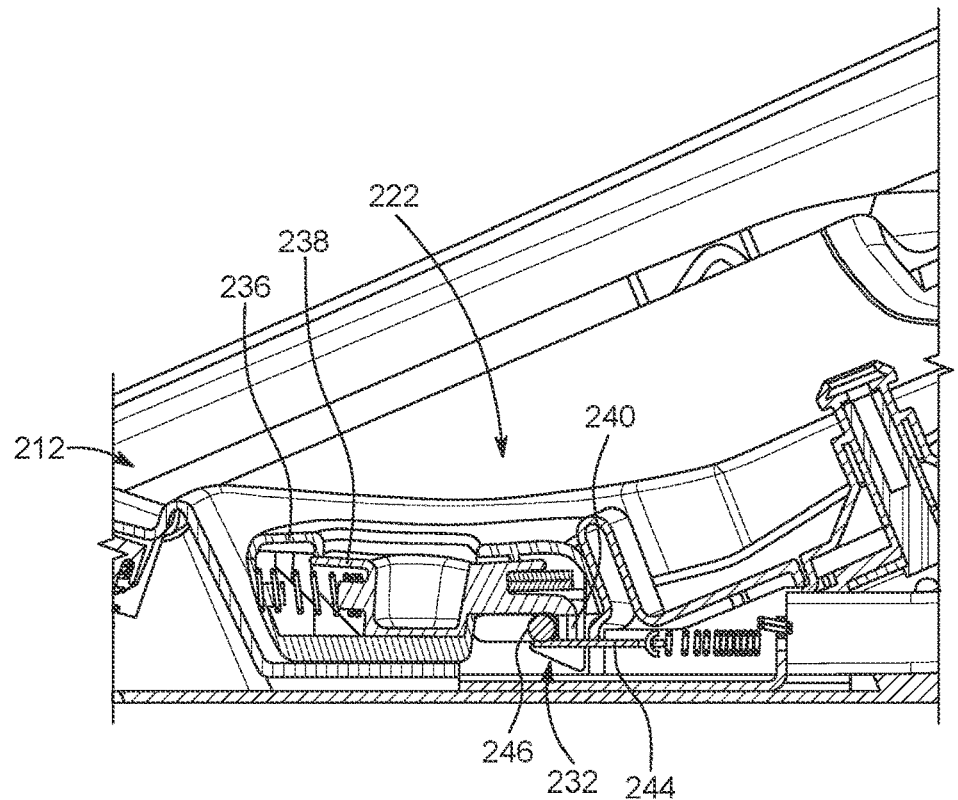
Figure 19:
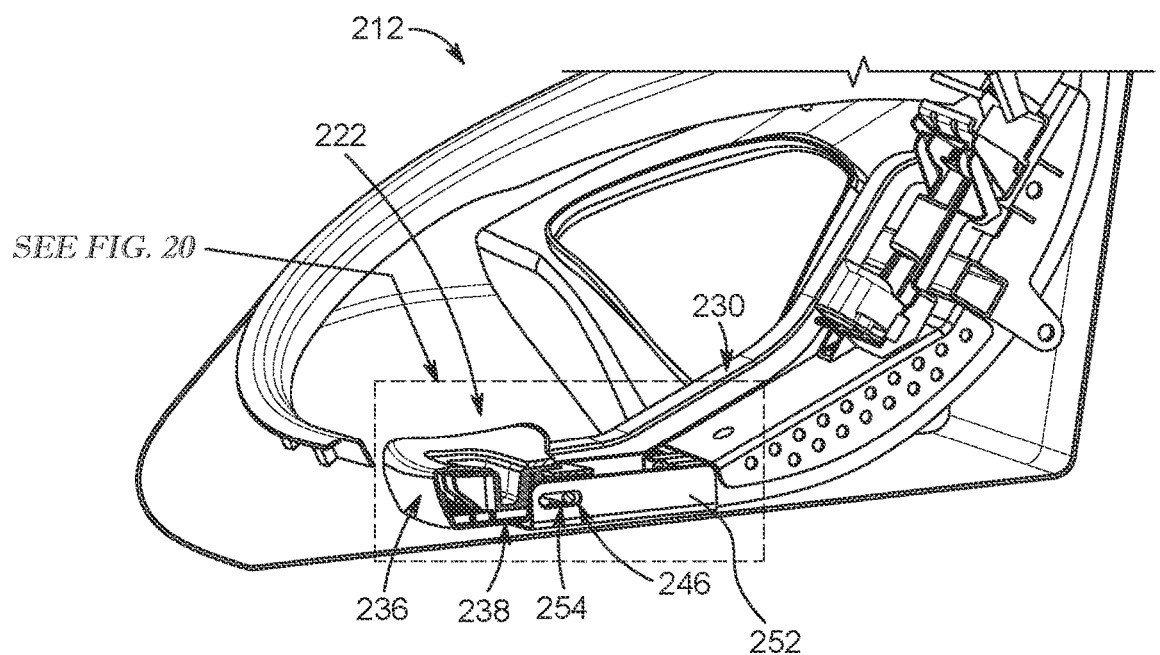
Figure 20:
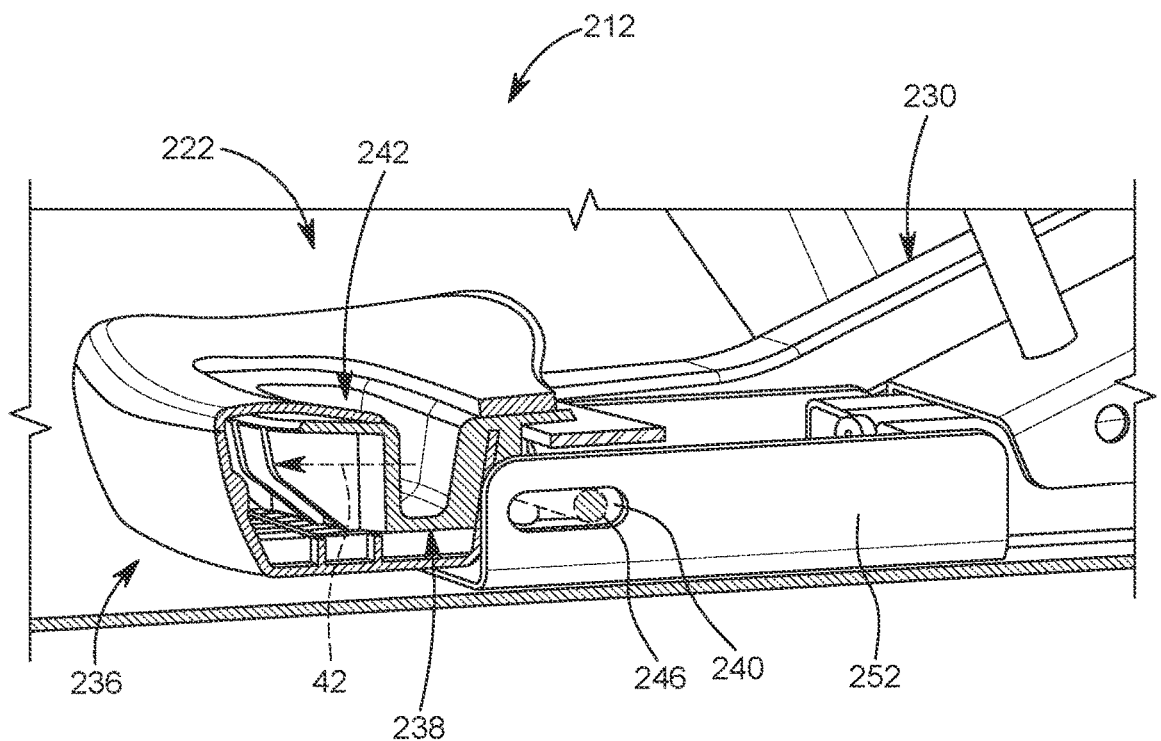
Figure 21:
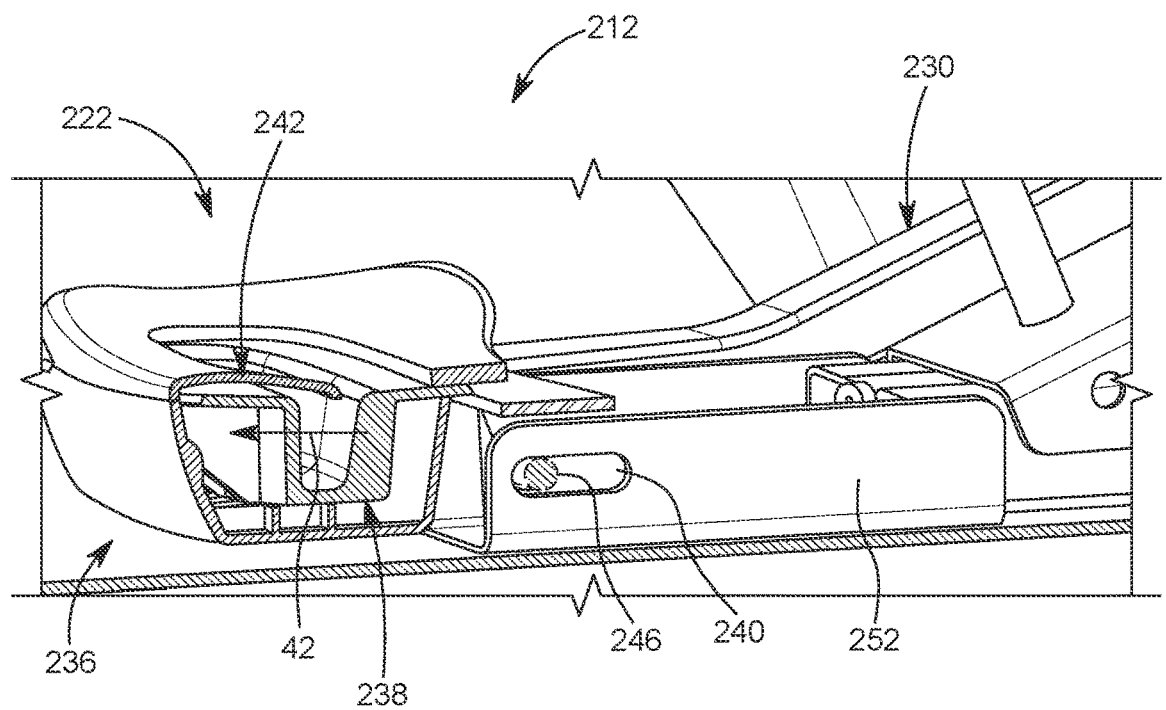
Figure 22:
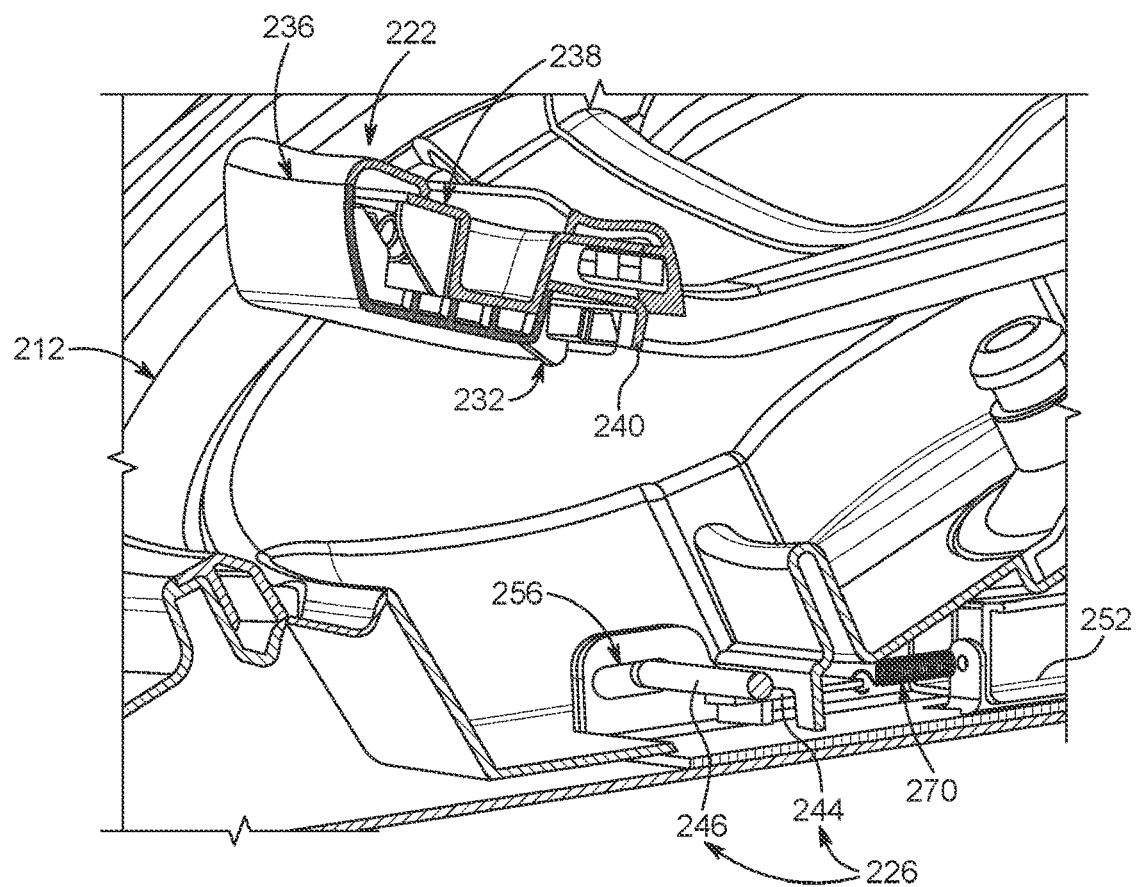
Figure 23:
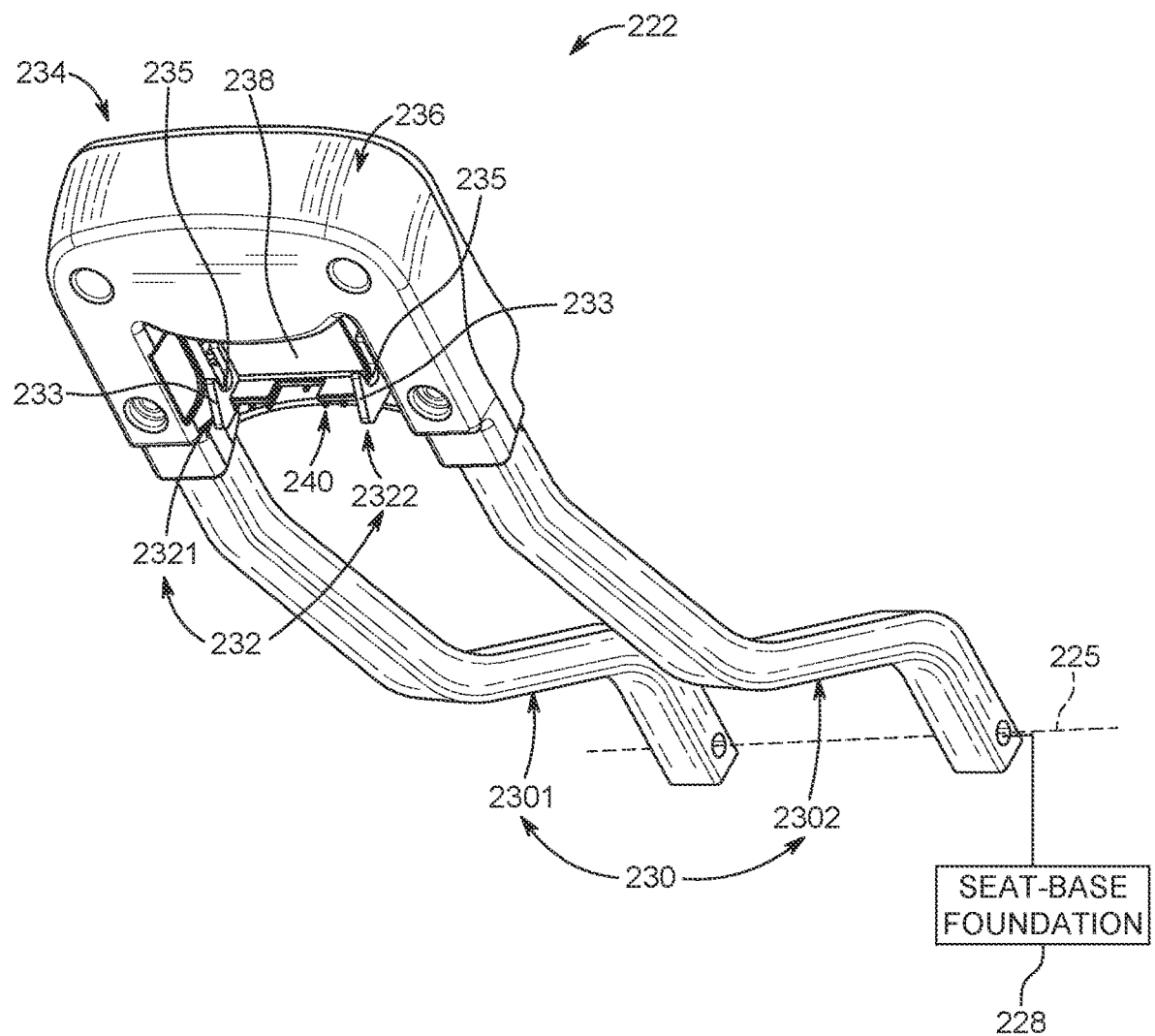

FIG. 5 is an exploded assembly view of the seat-belt retainer, the movable latch anchor, and a portion of the seat-base foundation showing that the seat-belt retainer includes a seat-belt clamp configured to engage the vehicle seat belt when the seat-belt retainer is in the closed position, a retainer latch fixed in position relative to the seat-belt clamp, and an anchor-release unit configured to engage the movable latch anchor in the closed position and to move the movable latch anchor from a locked position to an unlocked position so that the seat-belt retainer is free to move from the closed position to the opened position;

FIG. 6 is a perspective view of the seat-belt retainer showing that the anchor-release unit includes a handle housing formed to include a handle-receiving space, an actuator handle received in the handle-receiving space, an anchor mover that extends out of the handle-receiving space toward the movable latch anchor and that engages the movable latch anchor in the closed position to move the movable latch anchor to the unlocked position upon actuation of the actuator handle from an expanded position to a compressed position;

FIG. 7 is a perspective view of the movable latch anchor and a portion of a structural support frame included in the seat-base foundation showing that the movable latch anchor includes a movable pin carrier configured to engage the anchor mover and a movable anchor pin coupled to the movable pin carrier for movement with the movable pin carrier between the locked position, where the latch retainer is engaged with the movable anchor pin, as shown in FIG. 10, and the unlocked position, where the movable anchor pin is separated from the latch retainer by the anchor mover, as shown in FIG. 11;

FIG. 8 is a partial sectional view taken along line 8-8 down a center of the seat-belt retainer in FIG. 1 showing the seat-belt retainer in the opened position and spaced apart from a portion of the seat-base foundation and the movable latch anchor;

FIG. 9 is view similar to FIG. 8 showing the seat-belt retainer moved toward the closed position and showing the latch retainer engaging the movable anchor pin to move the movable anchor pin relative to the seat base-foundation as the seat-belt retainer pivots toward the closed position;

FIG. 10 is a view similar to FIG. 8 showing the seat-belt retainer in the closed position and showing the movable anchor pin biased into engagement with the retainer latch to retain the seat-belt anchor in the closed position;

FIG. 11 is a view similar to FIG. 10 showing the seat-belt retainer in the closed position and the release actuator moved to the compressed position to cause the anchor mover to disengage the movable anchor pin from the retainer latch so that the seat-belt retainer is free to pivot to the opened position;

FIG. 12 is a perspective view of another child restraint including a seat base and a juvenile seat separated from the seat base and showing that the seat base includes a seat-base foundation and a seat-belt retainer that is pivotable relative to the seat-base foundation from an opened position, as shown in FIG. 13, to a closed position, as shown in FIG. 14;

FIG. 13 is a perspective view of the seat base from FIG. 1 showing the seat-belt retainer in the opened position exposing a belt path surface of the seat-base foundation so that a vehicle seat belt can be routed across the belt path surface and then clamped to the seat-base foundation by the seat-belt retainer;

FIG. 14 is a perspective view of the seat base showing the seat-belt retainer in the closed position clamping the vehicle seat belt to the belt path surface of the seat-base foundation;

FIG. 15 is a sectional view taken along line 15-15 in FIG. 13 showing the seat-belt retainer in the opened position;

FIG. 16 is an enlarged view of a portion of FIG. 15 showing that the seat-belt retainer includes a seat-belt clamp configured to engage the vehicle seat belt when the seat-belt retainer is in the closed position, a retainer latch fixed in position relative to the seat-belt clamp, and an anchor-release unit configured to engage a movable latch anchor in the closed position and to move the movable latch anchor from a locked position to an unlocked position so that the seat-belt retainer is free to move from the closed position to the opened position;

FIG. 17 is a view similar to FIG. 16 showing the seat-belt retainer moved toward the closed position and showing the latch retainer engaging the movable latch anchor to move the movable latch anchor relative to the seat base-foundation as the seat-belt retainer pivots toward the closed position;

FIG. 18 is a view similar to FIG. 17 showing the seat-belt retainer in the closed position and showing the movable latch anchor biased into engagement with the retainer latch to retain the seat-belt anchor in the closed position;

FIG. 19 is a view taken along line 19-19 in FIG. 14 showing the seat-belt retainer in the closed position;

FIG. 20 is an enlarged view of a portion of FIG. 19 showing that the movable latch anchor includes a movable anchor pin coupled to the seat-base foundation and slidable within linear guide slots formed in the seat-base foundation to disengage from the retainer latch;

FIG. 21 is a view of similar to FIG. 20 showing that the anchor-release unit includes a handle housing formed to include a handle-receiving space, an actuator handle received in the handle-receiving space, an anchor mover that extends out of the handle-receiving space toward the movable latch anchor and that engages the movable latch anchor in the closed position to move the movable latch anchor to the unlocked position upon actuation of the actuator handle from an expanded position to a compressed position;

FIG. 22 is a view similar to FIG. 21 showing the seat-belt retainer moved to the opened position after actuating the actuator handle to separate the movable anchor pin from the retainer latch; and FIG. 23 is a perspective view of the seat-belt retainer showing that the retainer latch includes a pair of retainer hooks and showing that the seat-belt clamp includes a pair of clamp arms.

DETAILED DESCRIPTION

A child restraint, in accordance with the present disclosure, is configured to be mounted to a vehicle seat 11 and includes a seat base 12 and a juvenile seat 14 as shown in FIGS. 1-4. The seat base 12 may be secured to the vehicle seat 11, at least in part, by a routing a vehicle seat belt 16 across a belt path surface 18 of the seat base 12 and fixing the vehicle seat belt 16 to a belt anchor 20 of the vehicle 11. The child restraint 10 is installed on the vehicle seat 11 by first securing the vehicle seat belt 16 to the seat base 12 using a seat-belt retainer 22, as shown in FIG. 2, and, subsequently, attaching the juvenile seat 14 to the seat base 12 as shown in FIG. 3. The juvenile seat 14 is rotatable about a vertical rotation axis 24 and may be attached initially to the seat base 12 in a sideways orientation and then rotated to and locked in a travel orientation, such as a forward-facing orientation, as shown in FIG. 4, or a rearward-facing orientation. A first embodiment of the child restraint 10 is shown in FIGS. 1-11. A second embodiment of a child restraint 210 is shown in FIGS. 12-23.

The seat-belt retainer 22 is included in the seat base 12 and is configured to pivot about a horizontally-extending pivot axis 25 between an opened position and a closed position as shown in FIGS. 1 and 2. In the opened position, the seat-belt retainer extends outwardly away from the belt-path surface 18 to expose the belt path surface 18 to accept the vehicle seat belt 16. In the closed position, the seat-belt retainer 22 overlies the belt path surface 18 and clamps the vehicle seat belt 16 between the seat-belt retainer 22 and the belt path surface 18. The seat-belt retainer 22 is configured to engage a movable latch anchor 26 in the closed position to block movement of the seat-belt retainer 22 selectively from the closed position to the opened position.

In the closed position, the seat-belt retainer 22 is completely removed from a rotation travel path of the juvenile seat 14 relative to the seat base 12. Thus, the juveniles seat 14 is free to rotate 360 degrees about vertical rotation axis 24 while the seat base 12 is secured to the vehicle seat 11 by the seat-belt retainer 22.

The seat base 12 includes the seat-belt retainer 22, the movable latch anchor 26, and a seat-base foundation 28 as shown in FIGS. 1 and 2. The seat-belt retainer 22 is coupled to the seat-base foundation 28 for pivotable movement relative to the seat-base foundation 28 between the opened and closed positions. The movable latch anchor 26 is also coupled to the seat-base foundation 28 for movement relative to the seat-base foundation 28. The movable latch anchor 26 is configured to be moved relative to the seat-base foundation 28 by the seat-belt retainer 22 to disengage the movable latch anchor 26 from the seat-belt retainer 22 so that the seat-belt retainer 22 is free to pivot about the horizontally-extending pivot axis 25 from the closed position to the opened position.

The seat-belt retainer 22 includes a seat-belt clamp 30, a retainer latch 32, and an anchor-release unit 34 as shown in FIGS. 5 and 6. The seat-belt clamp 30 is configured to engage the vehicle seat belt 16 in the closed position to clamp the vehicle seat belt 16 between the seat-belt retainer 22 and the seat-base foundation 28 along belt path surface 18. The retainer latch 32 is configured to engage with the movable latch anchor 26 in the closed position to block movement of the seat-belt retainer 22 from the closed position to the opened position. The anchor-release unit 34 is configured to move the movable latch anchor 26 relative to the seat-base foundation 28 away from the retainer latch 32 to separate the movable latch anchor 26 from the retainer latch 32. Once the movable latch anchor 26 is separated from the retainer latch 32, the seat-belt retainer 22 is free to pivot about the horizontally-extending pivot axis 25 from the closed position to the opened position.

The anchor-release unit 34 is coupled to a distal end of the seat-belt clamp 30 spaced apart from the horizontally-extending pivot axis 25 and includes a handle housing 36, an actuator handle 38, and an anchor mover 40 as shown in FIGS. 5 and 6. The handle housing 36 is formed to include an internal, handle-receiving space 42. The actuator handle 38 is located at least partially within the internal handle-receiving space 42 defined by the handle housing 36. The anchor mover 40 is coupled to the actuator handle 38 for movement therewith and extends away from the actuator handle 38 to at least partially reside outside of the handle-receiving space 42. The anchor mover 40 is configured to actuate the movable latch anchor 26 upon movement of the actuator handle 38 relative to the handle housing 36 from an expanded position to a compressed position.

The movable latch anchor 26 includes a movable pin carrier 44 and an anchor pin 46 fixed to the movable pin carrier 44 for movement therewith relative to the seat-base foundation 28. The movable pin carrier 44 and the anchor pin 46 are both slidable relative to the seat-base foundation 28 between a locked position and an unlocked position. In the locked position, the retainer latch 32 grips the anchor pin 46 to block movement of the seat-belt retainer 22 from the closed position to the opened position. In the unlocked position, the anchor pin 46 is separated from the retainer latch 32 after actuation by the anchor mover 40.

The seat-base foundation 28 includes a base shell 50 and a structural support frame 52 that extends through an interior of the base shell 50 as shown in FIGS. 2, 5, and 6. The base shell 50 provides an exterior façade for the seat-base foundation 28. The support frame 52 rigidifies the seat-base foundation 28 to bear loads acting on the seat base 12, the juvenile seat 14, and the seat-belt retainer 22 such as inertial loads during use of the child restraint 10 in a vehicle. In some embodiments, the base shell 50 may be structural to bear loads acting on the seat base 12, the juvenile seat 14, and the seat-belt retainer 22 such that the support frame 52 may be omitted.

The support frame 52 is formed to include first and second pin guide slots 54, 56 as shown in FIGS. 5 and 6. The pin guide slots 54, 56 are linear and are formed on opposite sides of the movable pin carrier 44. The anchor pin 46 is received in the opposing first and second pin guide slots 54, 56 formed in the support frame 52 on respective sides of the movable pin carrier 44. The anchor mover 40 is configured to engage the pin carrier 44 when the seat-belt anchor 22 is in the closed position. The anchor mover 40 is separated from the pin carrier 44 when the seat-belt anchor 22 is in the opened position. The anchor mover 40 is configured to move the movable anchor pin 46 away from the retainer latch 32 when the seat-belt retainer 22 is in the closed position and when the actuator handle 38 is moved to the compressed position.

The movable latch anchor 26 is biased toward a first end 60 of the guide slots 54, 56 by a first spring 70 as shown in FIGS. 5 and 7-11. The first spring 70 is illustratively embodied as a tension spring that extends between and interconnects the support frame 52 of the seat-base foundation 28 and the movable pin carrier 44 and/or the movable anchor pin 46. The first spring 70 is configured to bias the movable anchor pin 46 toward the first end 60 of the guide slots 54, 56 and toward the horizontally-extending pivot axis 25. The retainer latch 32 is configured to move the movable anchor pin 46 from the first end 60 of the guide slots 54, 56 to an opposite, second end 62 of the guide slots 54, 56 as the seat-belt retainer 22 moves from the opened position to the closed position. The first end 60 of the guide slots 54, 56 is closer to the horizontal pivot axis 25 than the second end 62 of the guide slots 54, 56.

The retainer latch 32 includes a pair of retainer hooks 321, 322 which receive the movable anchor pin 46. Each of the retainer hooks 321, 322 are fixed to the handle housing 36 and do not move relative to the seat-belt clamp 30 or the anchor-release unit 34. The first and second retainer hooks 321, 322 each have an inclined surface 33 that engages and moves the latch anchor 26 relative the seat-base foundation 28 as the seat-belt retainer 22 is moved from the opened position to the closed position. The first and second retainer hooks 321, 322 further include a retaining surface 35 that engages the latch anchor pin 46 in the closed position to block movement of the seat-belt retainer 22 from the closed position to the opened position.

The first spring 70 is configured to retain the movable anchor pin 46 in engagement with the retainer surface 35 of the pair of retainer hooks 321, 322 to block unintentional release of the seat-belt retainer 22. In some embodiments, the first spring 70 may be another type of spring used to bias the movable latch anchor 26 such as a compression spring, leaf spring, or any other suitable resilient element.

The handle actuator 38 is biased toward the expanded position by a second spring 72 as shown in FIGS. 5 and 7-11. The actuator handle 38 is configured to be moved in an outward direction 100 away from horizontal pivot axis 25 thereby compressing the second spring 72 and moving the latch anchor 26 to disengage from the retainer latch 32. In the illustrative embodiment, the second spring 72 is a compression spring extending between the hand housing 36 and the actuator handle 38. The second spring 72 is configured to bias the actuator handle 38 in the same direction that the first spring 70 biases the movable latch anchor 26. In some embodiments, the second spring 72 may be another type of spring used to bias the actuator handle 38 such as a tension spring, leaf spring, or any other suitable resilient element.

The seat-belt clamp 30 includes a first clamp arm 301 and a second clamp arm 302 spaced apart from the first clamp arm 301 as shown in FIGS. 5 and 6. Each clamp arm 301, 302 has a first end mounted to the seat-base foundation 28 to provide the horizontally-extending pivot axis 25 and a second end coupled to the anchor-release unit 34 and spaced apart from the horizontal pivot axis 25. The first clamp arm 301 and the second clamp arm 302 are each received in a respective clamp arm channel 13, 15 formed in seat-base foundation 28 and partially defining the belt-path surface 18 in the closed position.

The seat-belt retainer 22 is configured to pivot about horizontally extending axis 25 in a rearward direction away from rotation axis 24 such that seat-belt retainer 22 is inclined away from the rotation axis 24 in the closed position. The seat base 12 further includes a juvenile seat mount 90 to which the juvenile seat 14 is attached to secure the juvenile seat 14 to the seat base 12. The juvenile seat mount 90 is also rotatable about rotation axis 24. The juvenile seat mount 90 is configured to be oriented in a sideways orientation as shown in FIGS. 1 and 2 while the vehicle seat belt 16 is routed across the belt path surface 18 and the seat-belt anchor 22 is used to clamp the vehicle seat belt 16 to the seat base 12. The seat-belt retainer 22 pivots in a rearward direction away from the juvenile seat mount 90 so as not to interfere with the juvenile seat mount 90. Other seat bases do not include a juvenile seat mount such as child restraints which do not have a rotatable juvenile seat.

A second embodiment of a child restraint 210, in accordance with the present disclosure, is shown in FIG. 12. Child restraint 210 is similar to child restraint 10 and the disclosure of child restraint 10 is incorporated by reference herein for child restraint 210.

Child restraint 210 is configured to be mounted to a vehicle seat 11 and includes a seat base 212 and a juvenile seat 214 as shown in FIGS. 12-14. The seat base 212 may be secured to the vehicle seat 11, at least in part, by a routing a vehicle seat belt 16 across a belt path surface 218 of the seat base 212 and fixing the vehicle seat belt 16 to a belt anchor 20 of the vehicle 11. The child restraint 210 is installed on the vehicle seat 11 by first securing the vehicle seat belt 16 to the seat base 212 using a seat-belt retainer 222, as shown in FIG. 13, and, subsequently, attaching the juvenile seat 214 to the seat base 212 as suggested in FIG. 12. The juvenile seat 214 is rotatable about a vertical rotation axis 224.

The seat-belt retainer 222 is included in the seat base 212 and is configured to pivot about a horizontally-extending pivot axis 225 between an opened position and a closed position as shown in FIGS. 13 and 14. In the opened position, the seat-belt retainer 222 extends outwardly away from the belt-path surface 218 to expose the belt path surface 218 to accept the vehicle seat belt 16. In the closed position, the seat-belt retainer 222 overlies the belt path surface 218 and clamps the vehicle seat belt 16 between the seat-belt retainer 222 and the belt path surface 218. The seat-belt retainer 222 is configured to engage a movable latch anchor 226 in the closed position to block movement of the seat-belt retainer 222 selectively from the closed position to the opened position.

In the closed position, the seat-belt retainer 222 is completely removed from a rotation travel path of the juvenile seat 214 relative to the seat base 212. Thus, the juveniles seat 214 is free to rotate 360 degrees about vertical rotation axis 24 while the seat base 12 is secured to the vehicle seat 11 by the seat-belt retainer 22.

The seat base 212 includes the seat-belt retainer 222, the movable latch anchor 226, and a seat-base foundation 228 as shown in FIGS. 12-14. The seat-belt retainer 222 is coupled to the seat-base foundation 228 for pivotable movement relative to the seat-base foundation 228 between the opened and closed positions. The movable latch anchor 226 is also coupled to the seat-base foundation 228 for movement relative to the seat-base foundation 228. The movable latch anchor 226 is configured to be moved relative to the seat-base foundation 228 by the seat-belt retainer 222 to disengage the movable latch anchor 226 from the seat-belt retainer 222 so that the seat-belt retainer 222 is free to pivot about the horizontally-extending pivot axis 225 from the closed position to the opened position.

The seat-belt retainer 222 includes a seat-belt clamp 230, a retainer latch 232, and an anchor-release unit 234 as shown in FIGS. 15-23. The seat-belt clamp 230 is configured to engage the vehicle seat belt 16 in the closed position to clamp the vehicle seat belt 16 between the seat-belt retainer 222 and the seat-base foundation 228 along belt path surface 218. The retainer latch 232 is configured to engage with the movable latch anchor 226 in the closed position to block movement of the seat-belt retainer 222 from the closed position to the opened position. The anchor-release unit 234 is configured to move the movable latch anchor 226 relative to the seat-base foundation 228 away from the retainer latch 232 to separate the movable latch anchor 226 from the retainer latch 232. Once the movable latch anchor 226 is separated from the retainer latch 232, the seat-belt retainer 222 is free to pivot about the horizontally-extending pivot axis 225 from the closed position to the opened position.

The anchor-release unit 234 is coupled to a distal end of the seat belt clamp 230 spaced apart from the horizontally-extending pivot axis 225 and includes a handle housing 236, an actuator handle 238, and an anchor mover 240 as shown in FIGS. 15-23. The handle housing 236 is formed to include an internal, handle-receiving space 242. The actuator handle 238 is located at least partially within the internal handle-receiving space 242 defined by the handle housing 236. The anchor mover 240 is coupled to the actuator handle 238 for movement therewith and extends away from the actuator handle 238 to at least partially reside outside of the handle-receiving space 242. The anchor mover 240 is configured to engage and actuate the movable latch anchor 226 upon movement of the actuator handle 238 relative to the handle housing 236 from an expanded position to a compressed position.

The movable latch anchor 226 includes a movable pin carrier 244 and an anchor pin 246 fixed to the movable pin carrier 244 for movement therewith relative to the seat-base foundation 228. The movable pin carrier 244 and the anchor pin 246 are both slidable relative to the seat-base foundation 228 between a locked position and an unlocked position. In the locked position, the retainer latch 232 grips the anchor pin 246 to block movement of the seat-belt retainer 222 from the closed position to the opened position. In the unlocked position, the anchor pin 246 is separated from the retainer latch 32 after actuation by the anchor mover 240.

The seat-base foundation 228 includes a base shell 250 and a structural support frame 252 that extends through an interior of the base shell 250 as shown in FIGS. 15-23. The base shell 250 provides an exterior façade for the seat-base foundation 228. The support frame 252 rigidifies the seat-base foundation 228 to bear loads acting on the seat base 212, the juvenile seat 214, and the seat-belt retainer 222 such as inertial loads during use of the child restraint 210 in a vehicle. In some embodiments, the base shell 250 may be structural to bear loads acting on the seat base 212, the juvenile seat 214, and the seat-belt retainer 222 such that the support frame 252 may be omitted.

The support frame 252 is formed to include first and second pin guide slots 254, 256 as shown in FIGS. 15-23. The pin guide slots 254, 256 are linear and are formed on opposite sides of the movable pin carrier 244. The anchor pin 246 is received in the opposing first and second pin guide slots 254, 256 formed in the support frame 252 on respective sides of the movable pin carrier 244. The anchor mover 240 is configured to engage the pin carrier 244 when the seat-belt anchor 222 is in the closed position. The anchor mover 240 is separated from the pin carrier 244 when the seat-belt anchor 222 is in the opened position. The anchor mover 240 is configured to move the movable anchor pin 246 away from the retainer latch 232 when the seat-belt retainer 222 is in the closed position and when the actuator handle 238 is moved to the compressed position.

The movable latch anchor 226 is biased to a first end 260 of the guide slots 254, 256 by a first spring 270 as shown in FIGS. 15-23. The first spring 270 is illustratively embodied as a tension spring that extends between and interconnects the support frame 252 of the seat-base foundation 228 and the movable pin carrier 244. The first spring 270 is configured to bias the movable anchor pin 246 toward the first end 260 of the guide slots 254, 256 and toward the horizontally-extending pivot axis 225. The retainer latch 232 is configured to move the movable anchor pin 246 from the first end 260 of the guide slots 254, 256 to an opposite, second end 262 of the guide slots 254, 256 as the seat-belt retainer 222 moves from the opened position to the closed position. The first end 260 of the guide slots 254, 256 is closer to the horizontal pivot axis 225 than the second end 262 of the guide slots 254, 256.

The retainer latch 232 includes a pair of retainer hooks 2321, 2322 which receive the movable anchor pin 246 in the closed position. Each of the retainer hooks 2321, 2322 are fixed to the handle housing 236 and do not move relative to the seat-belt clamp 230 or the anchor-release unit 234. The first and second retainer hooks 2321, 2322 each have an inclined surface 233 that engages and moves the latch anchor 226 relative the seat-base foundation 228 as the seat-belt retainer 222 is moved from the opened position to the closed position. The first and second retainer hooks 2321, 2322 further include a retaining surface 235 that engages the latch anchor pin 246 in the closed position to block movement of the seat-belt retainer 222 from the closed position to the opened position.

The first spring 270 is configured to retain the movable anchor pin 246 in engagement with the retainer surface 235 of the pair of retainer hooks 2321, 2322 to block unintentional release of the seat-belt retainer 222. In some embodiments, the first spring 270 may be another type of spring used to bias the movable latch anchor 226 such as a compression spring, leaf spring, or any other suitable resilient element.

The handle actuator 238 is biased toward the expanded position by a second spring 272 as shown in FIGS. 15-23. In the illustrative embodiment, the second spring 272 is a compression spring extending between the hand housing 236 and the actuator handle 238. The second spring 272 is configured to bias the actuator handle 238 in the same direction that the first spring 270 biases the movable latch anchor 226. In some embodiments, the second spring 272 may be another type of spring used to bias the actuator handle 238 such as a tension spring, leaf spring, or any other suitable resilient element.

The seat-belt clamp 230 includes a first clamp arm 2301 and a second clamp arm 2302 spaced apart from the first clamp arm 2301 as shown in FIG. 23. Each clamp arm 2301, 2302 has a first end mounted to the seat-base foundation 228 to define the horizontally-extending pivot axis 225 and a second end coupled to the anchor-release unit 234 and spaced apart from the horizontal pivot axis 225. The first clamp arm 2301 and the second clamp arm 2302 are each received in a respective clamp arm channel 213, 215 formed in seat-base foundation 228 and partially defining the belt-path surface 218 in the closed position.

The seat-belt retainer 222 is configured to pivot about horizontally extending axis 225 in a forward direction toward the rotation axis 224 such that seat-belt retainer 22 extends from the horizontally extending axis 225 and across the rotation axis 24 toward a front end of the seat-base foundation 228 in the closed position. The seat base 212 does not include juvenile seat mount 90 which is included in child restraint 10. Thus, seat base 212 does not include any other structure which is rotatable about rotation axis 24 with the juvenile seat 214. Due to this structure, seat-belt anchor 222 may pivot forward and cross the rotation axis 224 while residing in cavities formed in seat-base foundation 228 so as not to interfere with the juvenile seat 214 in the closed position.

The following numbered clauses are contemplated and non-limiting:

Clause 1. A child restraint includes a seat base adapted to rest on a vehicle seat.

Clause 2. The child restraint of clause 1, any other clause, or any combination of clauses, further including a juvenile seat adapted to mount to the seat base to secure the juvenile seat to the vehicle sea.

Clause 3. The child restraint of clause 2, any other clause, or any combination of clauses, wherein the seat base includes a seat-base foundation, a belt lock-off mounted to the seat-base foundation, and a tension indicator, Clause 4. The child restraint of clause 3, any other clause, or any combination of clauses, wherein the belt lock-off is configured to pivot between an opened position and a closed position to clamp a vehicle seat belt between the belt lock-off and the seat-base foundation along a belt path so that the seat base is secured to the vehicle seat.

Clause 5. The child restraint of clause 4, any other clause, or any combination of clauses, wherein the tension indicator is configured to visually indicate to a caregiver when the vehicle seat belt has a tension level above a predetermined amount to indicate that the seat base is properly secured to the vehicle seat.

Clause 6. The child restraint of clause 3, any other clause, or any combination of clauses, wherein the seat-base foundation is formed to include a juvenile-seat receiving space into which a portion of the juvenile seat extends when the juvenile seat is installed on the seat base and a distal end of the belt lock-off extends across the juvenile-seat receiving space to lie at a forward end of the seat base in the closed position.

Clause 7. The child restraint of clause 6, any other clause, or any combination of clauses, wherein the belt lock-off includes a pair of lock-off arms, a lock-off latch coupled to the distal end, and a release handle also coupled to the distal end.

Clause 8. The child restraint of clause 7, any other clause, or any combination of clauses, wherein the pair of lock-off arms extend across the belt path to clamp the vehicle seat belt to the seat-base foundation in the closed position and the lock-off latch is configured to engage with a movable lock bar coupled to the seat-base foundation to retain the belt lock-off in the closed position.

Clause 9. The child restraint of clause 8, any other clause, or any combination of clauses, wherein the release handle is configured to be pulled by a caregiver in a forward direction toward the forward end of the seat base to disengage the lock-off latch and the movable lock bar so that the belt lock-off is free to move to the open position.

The invention claimed is:

1. A seat base for a child restraint, the seat base comprising
   a seat-base foundation adapted to rest on a vehicle seat to support the child restraint in the vehicle, the seat-base foundation having a belt-path surface configured to receive a vehicle seat belt,
   a seat-belt retainer coupled to the seat-base foundation for pivotable movement about a horizontally-extending pivot axis between an opened position, in which the seat-belt retainer extends outwardly away from the belt-path surface to expose the belt path surface, and a closed position, in which the seat-belt retainer overlies the belt path surface to clamp the vehicle seat belt between the seat-belt retainer and the seat-base foundation, and
   a movable latch anchor coupled to the seat-base foundation and configured to engage the seat-belt retainer in the closed position to block movement of the seat-belt retainer from the closed position to the opened position,
   wherein the movable latch anchor is configured to be moved relative to the seat-base foundation by the seat-belt retainer to disengage from the seat-belt retainer so that the seat-belt retainer is free to pivot about the horizontally-extending pivot axis from the closed position to the opened position.

2. The seat base of claim 1, wherein the seat-belt retainer includes a seat-belt clamp configured to engage the vehicle seat belt in the closed position to clamp the vehicle seat belt between the seat-belt retainer and the seat-base foundation, a retainer latch configured to engage with the movable latch anchor in the closed position to block movement of the seat-belt retainer from the closed position to the opened position, and an anchor-release unit configured to move the movable latch anchor relative to the seat-base foundation to release the retainer latch so that the seat-belt retainer is free to pivot about the horizontally-extending pivot axis from the closed position to the opened position.

3. The seat base of claim 2, wherein the anchor-release unit includes a handle housing coupled to a distal end of the seat-belt clamp and spaced apart from the horizontally-extending pivot axis, an actuator handle received within an internal handle-receiving space defined by the handle housing, and an anchor mover coupled to the actuator handle for movement therewith to actuate the movable latch anchor upon movement of the actuator handle relative to the handle housing from an expanded position to a compressed position.

4. The seat base of claim 3, wherein the movable latch anchor includes a movable pin carrier and an anchor pin fixed to the movable pin carrier and received in opposing first and second pin guide slots formed in the seat-base foundation on respective sides of the movable pin carrier, and wherein the anchor mover is configured to engage the pin carrier and move the anchor pin away from the retainer latch when the seat-belt retainer is in the closed position and when the actuator handle is moved to the compressed position.

5. The seat base of claim 4, wherein the movable latch anchor is biased toward a first end of the guide slots by a spring.

6. The seat base of claim 5, wherein the handle actuator is biased in the same direction as the movable latch anchor.

7. The seat base of claim 4, wherein the anchor pin and the movable pin carrier are biased toward a first end of the guide slots and the retainer latch is configured to move the anchor pin from the first end of the guide slots to an opposite, second end of the guide slots as the seat-belt retainer moves from the opened position to the closed position.

8. The seat base of claim 7, wherein the first end of the guide slots is closer to the horizontal pivot axis than the second end.

9. The seat base of claim 2, wherein the seat-belt clamp includes a first clamp arm and a second clamp arm spaced apart from the first clamp arm, each clamp arm having a first end mounted to the seat-base foundation to provide the horizontally-extending pivot axis and a second end coupled to the anchor-release unit and spaced apart from the horizontal pivot axis.

10. The seat base of claim 9, wherein the first clamp arm and the second clamp arm are each received in a respective clamp arm channel formed in the seat-base foundation and partially defining the belt-path surface in the closed position.

11. The seat base of claim 2, wherein the retainer latch includes a first retainer hook and a second retainer hook, the first and second retainers hooks are fixed in position relative to the seat-belt clamp and the anchor-release unit.

12. The seat base of claim 11, wherein the first and second retainer hooks each have an inclined surface that engages and moves the latch anchor relative the seat-base foundation as the seat-belt retainer is moved from the opened position to the closed position and a retaining surface that engages the latch anchor in the closed position to block movement of the seat-belt retainer from the closed position to the opened position.

13. The seat base of claim 2, wherein the latch anchor is biased toward the horizontally-extending pivot axis and the retainer latch is configured to move the latch anchor away from the horizontally-extending pivot axis as the seat-belt retainer moves from the opened position to the closed position.

14. The seat base of claim 1, wherein seat-belt retainer is configured to pivot about the horizontally-extending pivot axis in a rearward direction away from a front end of the seat-base foundation from the opened position to the closed position.

15. A seat base for a child restraint, the seat base comprising
   a seat-base foundation adapted to rest on a vehicle seat to support the child restraint in the vehicle, the seat-base foundation having a belt-path surface configured to receive a seat belt, and
   a belt retainer coupled to the seat-base foundation for pivotable movement about a horizontally-extending pivot axis between an opened position, in which the seat-belt retainer extends outwardly away from the belt-path surface to expose the belt path surface, and a closed position, in which the seat-belt retainer overlies the belt path surface to clamp a vehicle seat belt between the seat-belt retainer and the seat-base foundation,
   wherein the belt retainer includes a belt clamp configured to engage the vehicle seat belt in the closed position to clamp the vehicle seat belt between the belt retainer and the seat-base foundation, a retainer latch configured to block movement of the belt retainer from the closed position to the opened position, and a release unit fixed to a distal end of the belt clamp spaced apart from the horizontally-extending pivot axis and configured to release the retainer latch so that the belt retainer is free to pivot about the horizontally-extending pivot axis from the closed position to the opened position, and wherein the retainer latch does not move relative to the seat-belt clamp and the release unit.

16. The seat base of claim 15, further comprising a movable latch anchor coupled to the seat-base foundation and configured to engage the belt retainer in the closed position to block movement of the belt retainer from the closed position to the opened position.

17. The seat base of claim 16, wherein the movable latch anchor is configured to be moved relative to the seat-base foundation by the belt retainer to disengage from the belt retainer so that the seat-belt retainer is free to pivot about the horizontally-extending pivot axis from the closed position to the opened position.

18. The seat base of claim 16, wherein the release unit includes a handle housing coupled to the distal end of the seat-belt clamp and spaced apart from the horizontally-extending pivot axis, an actuator handle received within an internal handle-receiving space defined by the handle housing, and a mount mover coupled to the actuator handle for movement therewith to actuate the movable latch anchor upon movement of the actuator handle relative to the handle housing from an expanded position to a compressed position.

19. The seat base of claim 16, wherein the movable latch anchor includes a movable anchor pin that is received within a pair of guide slots formed in the seat-base foundation.

20. The seat base of claim 19, wherein the movable anchor pin is biased toward a first end of the guide slots, is configured to be moved by the retainer latch away from the first end of the guide slots as the belt retainer changes from the opened position to the closed position, and is configured to be moved by the release unit away from the first end of the guide slots to disengage the movable anchor pin from the retainer latch.

* * * * *